United States Patent [19]
Morita et al.

[11] Patent Number: 5,831,684
[45] Date of Patent: Nov. 3, 1998

[54] SUBPICTURE IMAGE SIGNAL VERTICAL COMPRESSION CIRCUIT

[75] Inventors: Tomoko Morita, Hirakata; Naoji Okumura, Minou; Masahiro Tani, Daito, all of Japan

[73] Assignee: Matsushita Electric Industrial Co., Ltd., Osaka, Japan

[21] Appl. No.: 657,643

[22] Filed: May 30, 1996

[30] Foreign Application Priority Data

Jun. 2, 1995 [JP] Japan ................................. 7-136451

[51] Int. Cl.$^6$ ............................................. H04N 5/446
[52] U.S. Cl. .......................... 348/568; 348/565; 348/513
[58] Field of Search .................................... 348/568, 563, 348/564, 566, 567, 513; H04N 5/446

[56] References Cited

U.S. PATENT DOCUMENTS

| | | | |
|---|---|---|---|
| 4,249,213 | 2/1981 | Imaide et al. | 348/565 |
| 4,638,360 | 1/1987 | Christopher et al. | 348/565 |
| 4,816,915 | 3/1989 | Imai et al. | 348/565 |
| 4,984,083 | 1/1991 | Okamoto et al. | 348/565 |
| 4,991,013 | 2/1991 | Kobayashi | 348/565 |
| 4,992,874 | 2/1991 | Willia et al. | 348/565 |
| 5,021,887 | 6/1991 | Park | 348/565 |

FOREIGN PATENT DOCUMENTS 62-23507   5/1987   Japan .

*Primary Examiner*—Brian Casler
*Assistant Examiner*—LuAnne P. Dinn
*Attorney, Agent, or Firm*—Ratner & Prestia

[57] ABSTRACT

A subpicture image signal vertical compression circuit for vertically compressing subpictures operating at respective synchronous timings different from that of the main picture when a plurality of image signals having respectively different synchronizations are displayed on an image display device. Depending on whether the field polarities of main and sub pictures are the same or not, the subpicture image signal vertical compression circuit generates suitable offsets for the first and the second fields to adjust the phases and prevent the inversion of the scan order in the vertical direction, at the first field and the second field of subpicture signal, after the phase adjustment to obtain a subpicture image with natural motion in the vertical direction.

6 Claims, 6 Drawing Sheets

SUBPICTURE IMAGE SIGNAL VERTICAL COMPRESSION CIRCUIT

FIELD OF THE INVENTION

The invention relates to a subpicture image signal vertical compression circuit for vertically compressing sub pictures operating at respective synchronous timings different from that of the main picture when a plurality of image signals, having respective different synchronizations, are displayed on an image display device. Specifically, the invention relates to a subpicture image signal vertical compression circuit for a compressed interlace display of one or more subpictures having respective synchronous timings different from that of a main picture displayed on an image display device together with the main picture.

BACKGROUND OF THE INVENTION

The need for simultaneously displaying a plurality of images and information has recently increased. In particular, demand for displays corresponding to multimedia requirements have increased. FIGS. 6(a) and 6(b) show examples of the display device. A subpicture 2 is displayed in the main picture 1 as shown in FIG. 6 (a), or subpictures 4, 5, 6 having the same size as the main picture 3 are simultaneously displayed as shown in FIG. 6 (b). The picture displayed as the main picture is the image signal used as the synchronization signal of the display screen.

When a plurality of image signals having respective synchronization signals are simultaneously displayed on an image display device, the synthesis of those images is important.

Since the main picture signal is synchronized with the image display device, the timing of its image signal processing, such as picture compression, is not a problem. On the other hand, because the subpicture signals are not synchronized with the image display device, the timing of those signals must be considered.

The invention relates to a subpicture image signal vertical compression circuit for compressing the subpicture image signal in the vertical direction by vertical interpolation. The main picture signal and the subpicture signal are assumed to be interlaced signals.

Hereafter, a conventional subpicture image signal vertical compression circuit will be illustrated referring to drawings. FIG. 4 is the block diagram of a conventional subpicture image signal vertical compression circuit. FIG. 5 is an operational waveform diagram for illustrating the operation of the conventional subpicture image signal vertical compression circuit. The signals shown in FIG. 4 and FIG. 5 correspond to each other.

In FIG. 4, 31 is a field discrimination circuit for determining, from the vertical pulse and the horizontal pulse, the polarity of the field, that is, for determining from which of a first field (odd number field) or a second field (even number field) the scan starts. 32 is an offset generation circuit for generating offsets corresponding to the compression rates in the first and second fields. 33 is an interpolation circuit for interpolating and compressing the input image signal by the compression rate.

The operation of the subpicture image signal vertical compression circuit structured as above is described below.

The field discrimination circuit 31 determines whether the polarity is the first field or the second field from the vertical pulse and the horizontal pulse and outputs the result. The offset circuit 32 makes the offset of the first field 0, and determines the offset of the second field according to the compression rate of the subpicture. In FIG. 5, a five line signal of an input subpicture image signal is compressed to a four line signal in the subpicture. The compression rate is ⅘, and ½ of the interlace is subtracted from ½ of the reciprocal of the compression rate and the offset becomes $$1/8 \left( \text{i.e.} \left( \frac{1}{2} \times \frac{5}{4} \right) - \frac{1}{2} = \frac{1}{8} \right).$$

Interpolation circuit 33 sets pixel values between the scanning lines by interpolation and outputs the compressed image signal by thinning out the scanning lines. At this time, pixel values are interpolated at the position time-delaying by the offset at the second field.

As to the conventional constitution illustrated above, when the main picture and the subpicture, each having a different field polarity, are displayed at the same time, since the phase of the second field signal of the subpicture after the compression is not ½ that of the first field, the scanning order in the vertical direction of subpicture signal may be reversed at the first field and the second field and this causes distortion of the image in the vertical direction.

SUMMARY OF THE INVENTION

In consideration of the above problems, the present invention provides a subpicture image signal vertical compression circuit for providing a subpicture without distortion in the vertical direction through the steps of:

judging if the field polarity of the subpicture is the same as that of the main picture;

generating offsets of the first field and the second field according to above judgment;

correcting the phase of pixel value interpolation according to the offsets and performing the interpolation and the compression.

To solve above problems, the subpicture image signal vertical compression circuits comprise:

a main picture field discrimination circuit for generating a field discrimination signal for discriminating the polarity indicating if the field scan of the main picture starts, from the first field or second field from the vertical pulse and the horizontal pulse of the main picture;

a subpicture field discrimination circuit for generating a field discrimination signal for discriminating the field scan start polarity of the subpicture displaying a compressed input subpicture image signal compressed by a predetermined rate, from the vertical pulse and the horizontal pulse of the subpicture;

an offset generation circuit for generating offsets corresponding to the compression rate at the first field and the second field of the subpicture by imputing the main picture field discrimination signal, the subpicture field discrimination signal, and the compression rate;

an output circuit for inputting said offsets, said compression rate, and said input subpicture image signal; shifting the field scan start timing of the subpicture by the equivalent of the offset; vertically compressing said input subpicture image signal; and outputting the compressed signal.

The subpicture image signal vertical compression circuit of claim 5 of the invention comprises:

a main picture field discrimination circuit for generating a main picture field discrimination signal from the vertical pulse and the horizontal pulse of the main picture;

a subpicture field discrimination circuit for generating a subpicture field discrimination signal from the vertical pulse and the horizontal pulse of the subpicture;

the offset generation circuit generates offsets corresponding to said compression rate at the first field and the second field of the subpicture by imputing the main picture field discrimination signal, the subpicture field discrimination signal, and the compression rate;

the offset generation circuit generates offsets corresponding to said compression rate at the first field and the second field of the subpicture by imputing the main picture field discrimination signal, the subpicture field discrimination signal, and the compression rate;

a frequency difference detection circuit: inputting the output signal of the offset generation circuits, the main picture field frequency, and the subpicture field frequency; detecting the difference between the main picture field frequency and the subpicture field frequency; selecting the output signal of the offset generation circuit; and outputting the selected signal;

an interpolation circuit: inputting the output signal of said frequency difference detection circuit, the compression rate, and the input subpicture image signal; interpolating the input subpicture image signal; and outputting interpolated signal.

By this structure of the invention, suitable offsets are generated at the first field and the second field according to whether the polarities of main picture and subpicture are the same or not. The compression is performed, the inversion of the scan order in the vertical direction of the subpicture signal at the first field and the second field after the synthesis with main picture can be prevented, so a subpicture image, without unnatural movement in the vertical direction can be obtained.

Further, more preferable offsets can be generated by switching the two offset circuits by using the main picture field frequency and the subpicture field frequency.

BRIEF DESCRIPTION OF THE DRAWINGS

FIG. 6 (b) is a second example of a plurality of image signals having respective different timings of the synchronization signal displayed on an image display device.

DESCRIPTION OF THE PREFERRED EMBODIMENTS

Figure 1:
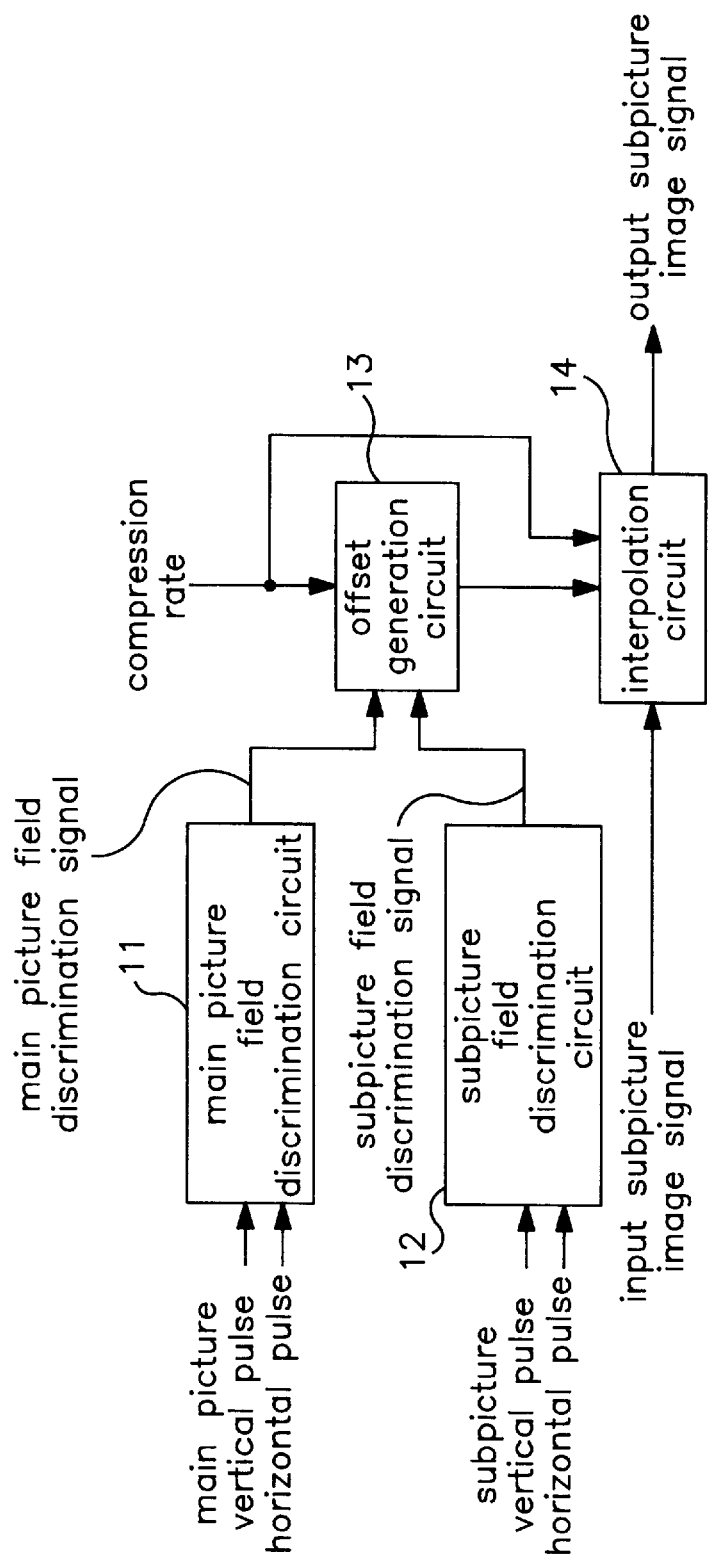
FIG. 1 is a block diagram of a subpicture image signal vertical compression circuit showing an embodiment of the invention.
Figure 2:
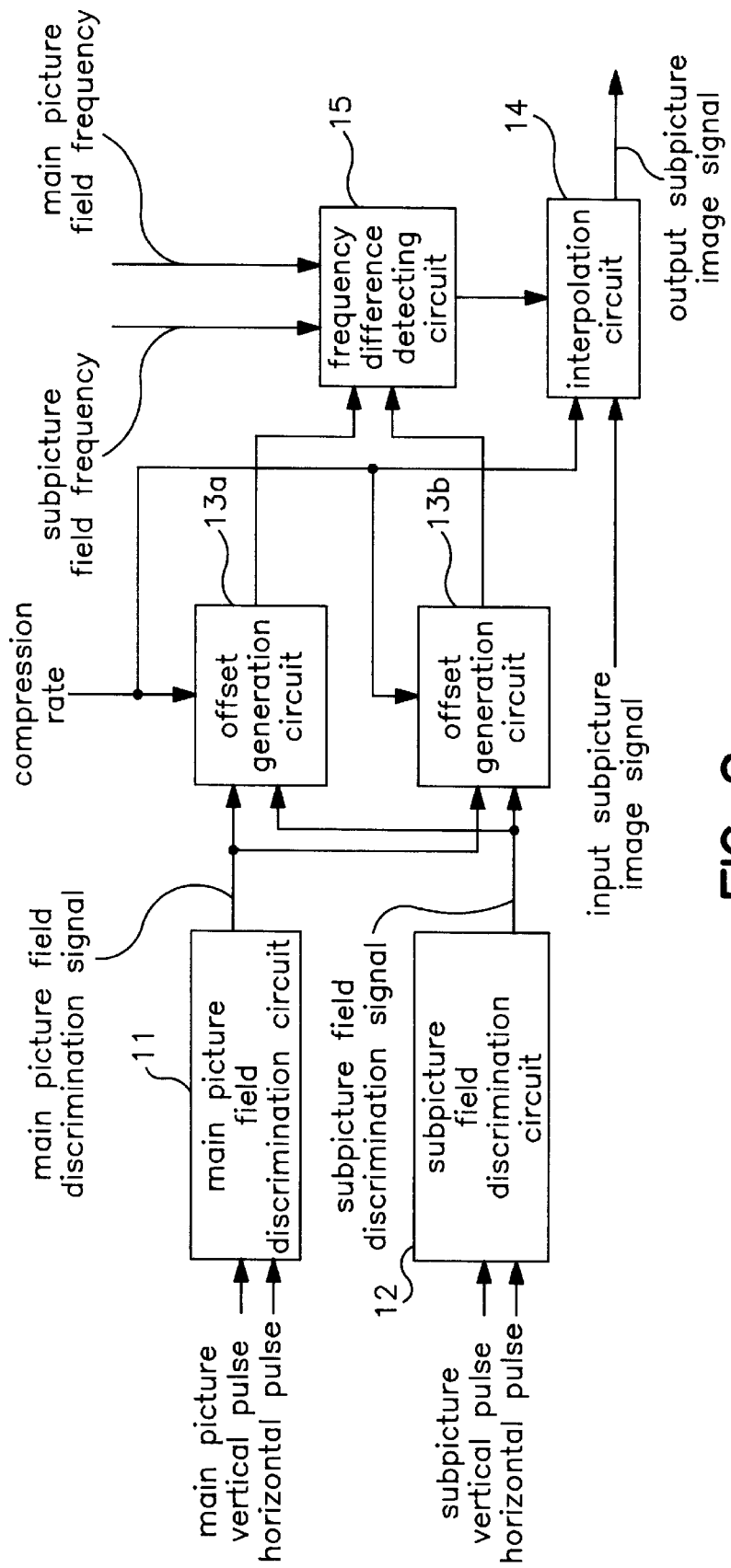
FIG. 2 is a block diagram of a subpicture image signal vertical compression circuit showing another embodiment of the invention.
Figure 3:
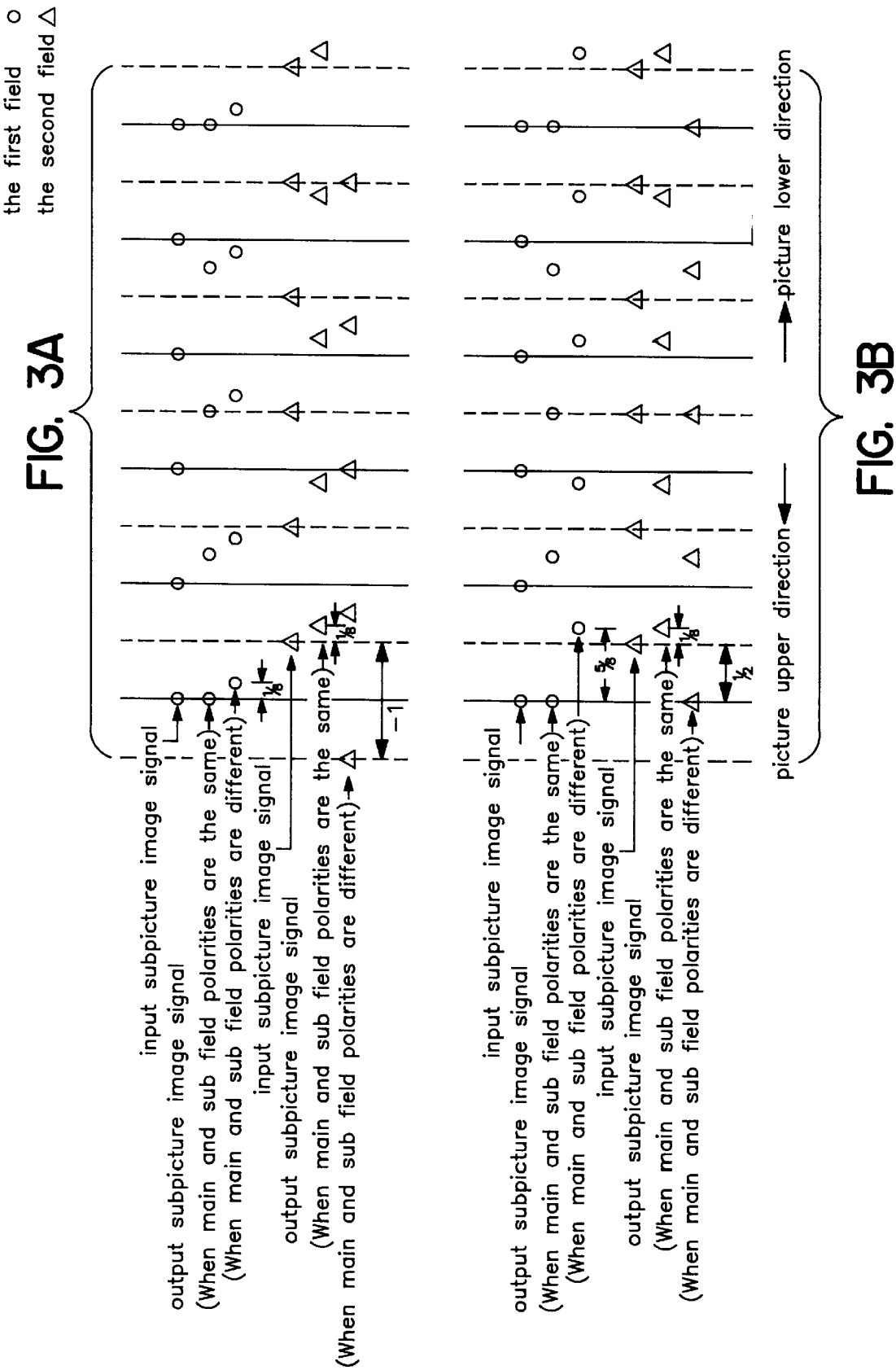
FIGS. 3(a) and 3(b) are operational waveform diagrams illustrating the operation of the circuit.
Figure 4:
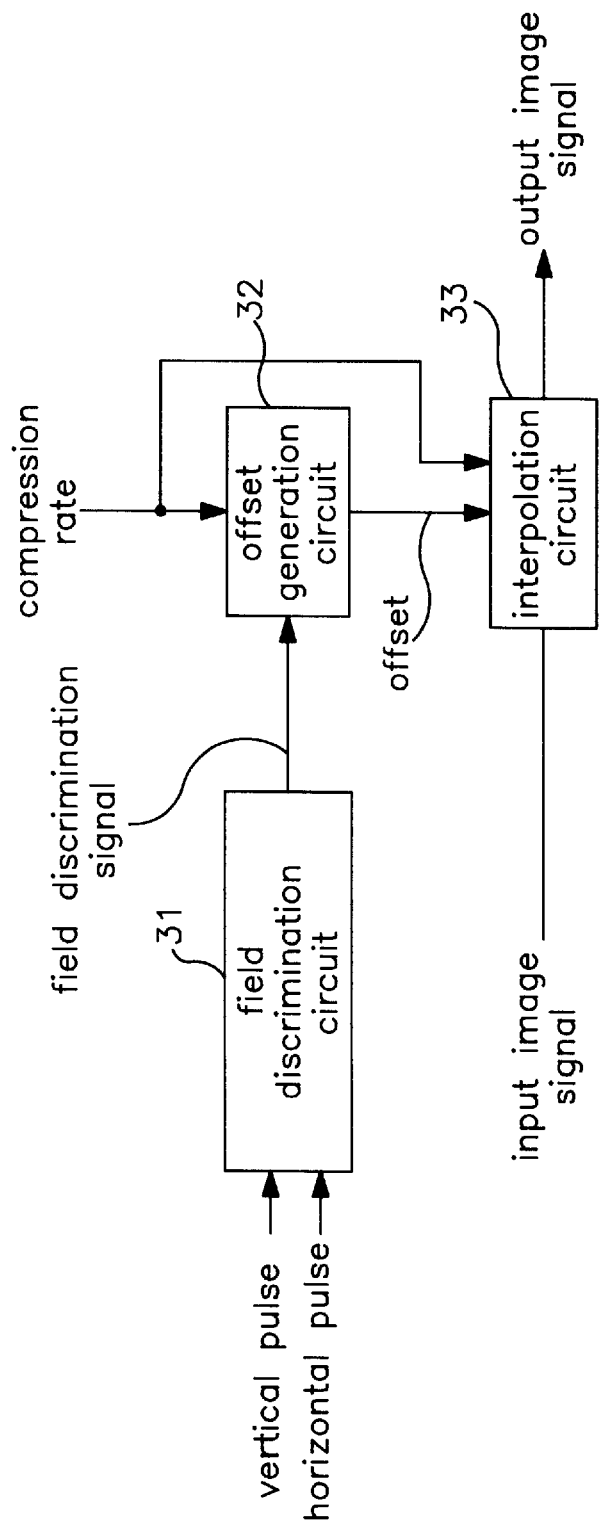
FIG. 4 is a block diagram of a conventional subpicture image signal vertical compression circuit.
Figure 5:
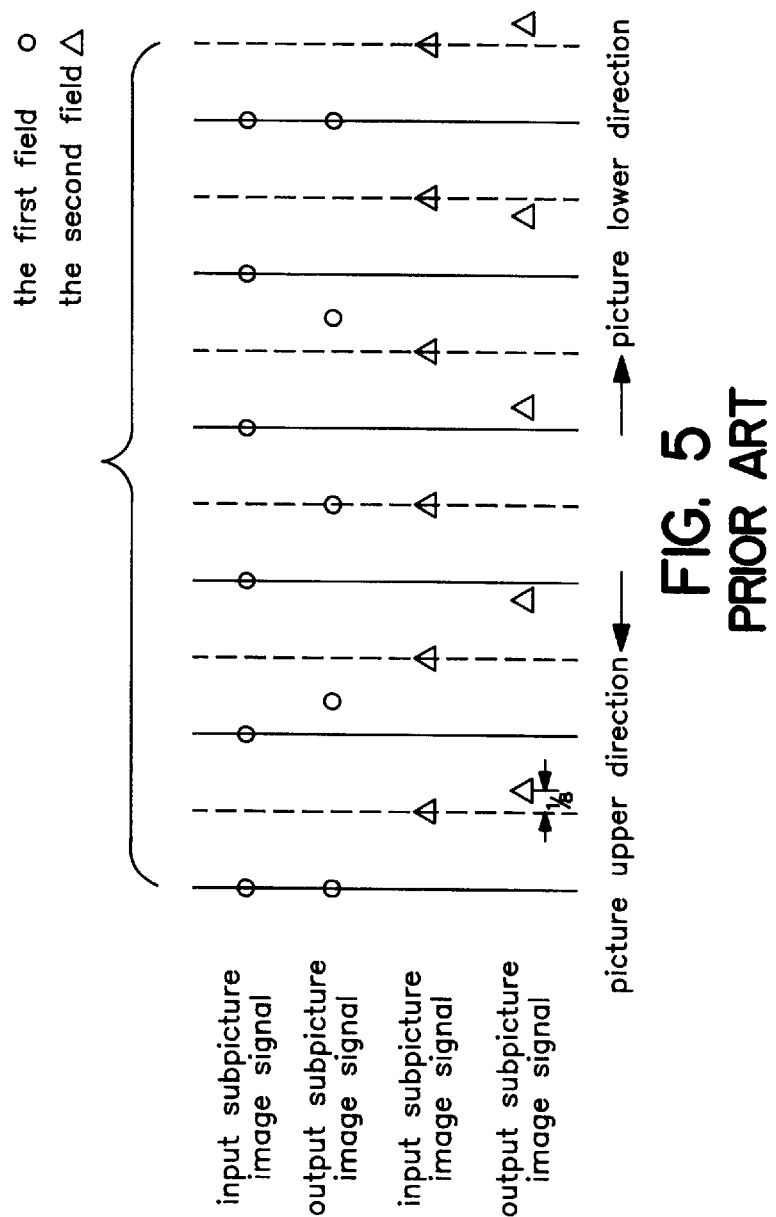
FIG. 5 is an operational waveform diagram for illustrating the operation of the circuit.
Figure 6B:
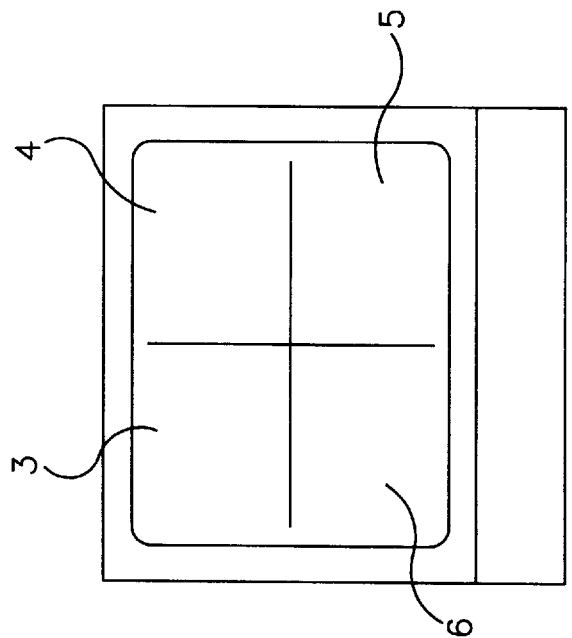
FIG. 6 (a) is a first example of a plurality of image signals having respective different timings of the synchronization signal displayed on an image display device.
Figure 6A:
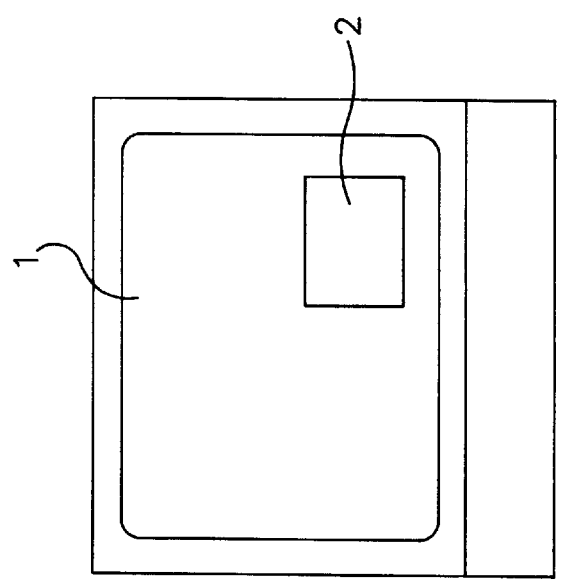

A subpicture image signal vertical compression circuit of an embodiment of the invention will be illustrated referring to the drawings. FIG. 1 is a block diagram of a subpicture image signal vertical compression circuit showing an embodiment of the invention. FIG. 2 is a block diagram of a subpicture image signal vertical compression circuit showing another embodiment of the invention. FIGS. 3(a) and 3(b) are operational waveform diagrams for illustrating the operation of the subpicture image signal vertical compression circuit showing an embodiment of the invention. Signals shown in FIGS. 1 through 3 correspond to each other.

In FIG. 1, 11 is a main picture field discrimination circuit for determining the field polarity of the main picture from the vertical pulse and the horizontal pulse of the image signal having the image information of the main picture. 12 is a subpicture field discrimination circuit for discriminating the field polarity of the subpicture from the vertical pulse and the horizontal pulse of the input subpicture image signal.

13 is an offset generation circuit for generating offsets corresponding to the compression rate at the first field and the second field of the subpicture. 14 is an interpolation circuit for interpolating the input subpicture image signal based on the offsets and the compression rate.

The operation of the subpicture image signal vertical compression circuit structured as above is described hereafter.

The main picture field discrimination circuit 11 determines whether the polarity is the first field or the second field from the vertical pulse and horizontal pulse of the main picture and outputs the result.

The subpicture field discrimination circuit 12 determines whether the polarity is the first field or the second field from the vertical pulse and horizontal pulse of the subpicture and outputs the result.

The offset circuit 13 determines offsets by the following steps.

When the field polarities of main picture and subpicture are the same, the offset of the first field is 0, and the offset of the second field is determined according to the compression rate. In FIGS. 3(a) and 3(b) a five line signal of an input subpicture image signal is compressed into a four line signal subpicture. The compression rate is ⅘, and ½ is subtracted from ½ of the reciprocal of the compression rate to result in an offset of ⅛.

When the field polarities of main picture and subpicture are different, the offset of the first field is obtained by subtracting ½ from ½ of the reciprocal of the compression rate and the offset of the second field is determined as −1.

Next, since interpolation circuit 14 sometimes has to arrange pixels at the portion where a scan line doesn't exist because of thinning out the compression and the like, pixels are arranged between the scan lines by interpolation, the input subpicture image signal is then compressed and output. In this way, the interpolation phases of the first field and the second field are delayed by each of the offsets.

Some thinning methods allow compression using pixels on a scan line, accordingly, interpolation is not performed in this case, and compression thinning of the same lines can be performed simply.

Using the offset circuit is shown in FIG. 3(a), when the field polarities of the main picture and subpicture are the same, since the offset of the first field is 0, the input subpicture image signal and the output subpicture image signal have the same interpolation phase (when main and sub fields have the same polarity), and since the offset of the second field is ⅛, the output subpicture image signal (when main and sub fields have the same polarity) is delayed by ⅛ with respect to the input subpicture image signal of the second field.

When the main and sub fields have different polarities, the offset is ⅛ in the first field, the output subpicture image signal (when main and sub fields have different polarities) is delayed by ⅛ of the phase with respect to the input subpicture image signal and since the offset of the second field is −1, the output subpicture image signal (when main and sub fields have different polarities) advances by 1 with respect to the input subpicture image signal of the second field.

As above, according to whether the main and sub field polarities are the same or not, the offsets generated at the first and second fields are switched to prevent the inversion of the scan order in the vertical direction at the first field and the second field of the subpicture signal after synthesis with the main picture to obtain the subpicture having natural movement in the vertical direction. Since the offset of the first field and the offset of the second field are only interchanged according to whether the polarities of main and sub pictures are the same or not, there is an advantage that picture quality of subpicture after interpolation and compression in the vertical direction can be maintained.

However, there is a disadvantage that the phase of the subpicture after interpolation and compression in the vertical direction moves by 0.5 line depending on whether the polarities of main and sub pictures are the same.

When the field polarities of main and sub pictures are the same the offset of the first field is determined as 0. The offset of the second field is obtained by subtracting ½ from ½ of the reciprocal of the compression rate. When the field polarities of main and sub pictures are different, however, the offset of the first field is ½ of the reciprocal of the compression rate, the offset of the second field is determined as −½ to make the phase of the subpicture after interpolation and compression in the vertical direction the same whether the field polarities of main and the sub pictures are the same or not.

As shown in FIG. 3(b), when the field polarities of the main picture and the subpicture are the same, since the offset of the first field is 0 the input subpicture image signal and the output subpicture image signal have the same interpolation phase (when main and sub fields have the same polarity), and since the offset of the second field is ⅛, the output subpicture image signal (when main and sub fields have the same polarity) is delayed by ⅛ of the phase with respect to the input subpicture image signal of the second field.

When main and sub fields have different field polarities, since the offset is ⅝ in the first field, the interpolation phase of the output subpicture image signal (when main and sub fields have different polarities) is delayed by ⅝ with respect to the input subpicture image signal. Since the offset in the second field is −½, the phase of the output subpicture image signal (when main and sub fields have different polarities) advances by ½ with respect to that of the input subpicture image signal of the second field.

However, since the offsets given are changed according to whether the main and sub field polarities are the same or not, the qualities of the subpicture after interpolation and compression in the vertical direction are different.

The offset generation circuits are switched based on whether the difference between the main picture frequency and the subpicture frequency is large or small.

When the frequency difference is small, since switching of the main and sub field polarities does not occur very often, the phase moves by 0.5 line of the subpicture after interpolation and compression in the vertical direction between the cases where the main and sub field polarities are the same or different is allowable. Priority being on the picture quality, the offset generation circuit 13a is selected, and the interpolation and compression is performed by using the output from the offset circuit 13a as the offsets. When the frequency difference is large, since switching of the same or different of main and sub field polarities occurs very often, so that the phase slide by 0.5 line is not allowable, the offset generation circuit 13b is selected to make the phase of subpicture after interpolation and compression in the vertical direction the same phase.

In the invention illustrated above, the offsets of the first field and the second field are switched according to whether the field polarities of main and sub pictures are the same or not, further, performing interpolation and compression by selecting one suitable offset generation circuit from the two offset circuits by the relation between the field frequencies of the main picture and the subpicture, a subpicture image with natural movement in vertical direction can be obtained.

What is claimed is:

1. A subpicture image signal vertical compression circuit for use with a main picture signal corresponding to a main picture and a subpicture signal corresponding to subpicture, each of said main picture signal and said subpicture signal having a respective first field and second field, said main picture signal having a scanning field, and said subpicture signal having a field scan start signal, comprising:

a main picture field discrimination circuit for generating a first field discrimination signal for indicating whether the scanning field of the main picture signal starts with the first field or the second field of the main picture;

a subpicture field discrimination circuit for generating a second field discrimination signal for indicating a polarity of the field scan start signal of the subpicture signal compressed by a predetermined compression rate;

an offset generation circuit for generating offsets for determining whether the subpicture signal compressed by the predetermined compression rate is put into the first field or the second field of the main picture for the first field and the second field of the subpicture signal based on i) said first field discrimination signal, ii) said second field discrimination signal, and iii) said compression rate; and an output circuit for i) shifting a timing of the field scan start signal of said subpicture based on said offsets and ii) generating a vertically compressed subpicture image signal based on said offsets and said compression rate.

2. The subpicture image signal vertical compression circuit of claim 1, wherein said output circuit outputs interpolated pixel values from pixel values of said input subpicture image signal and performs the vertical compression by reducing the number of scan lines.

3. The subpicture image signal vertical compression circuit of claim 1, wherein said offset generation circuit
   i) sets an offset of the first field to 0, and determines an offset of the second field by subtracting ½ from ½ of a reciprocal of the compression rate when field polarities of the main picture and the subpicture are the same, and
   ii) determines the offset of the first field by subtracting ½ from ½ of the reciprocal of the compression rate and sets the offset of the second field to −1 when the field polarities of the main picture and the subpicture are different.

4. The subpicture image signal vertical compression circuit of claim 1, wherein said offset generation circuit
   i) sets an offset of the first field to 0, and determines an offset of the second field by subtracting ½ from ½ of a reciprocal of the compression rate when field polarities of the main picture and the subpicture are the same, and ii) determines the offset of the first field as ½ of the reciprocal of the compression rate and sets the offset of the second field to −½ when the field polarities of the main picture and the subpicture are different.

5. The subpicture image signal vertical compression circuit of claim 1, wherein said offset generation circuit comprises:

a first offset generation circuit for
  i) setting an offset of the first field to 0, and determining the offset of the second field by subtracting ½ from ½ of a reciprocal of the compression rate when field polarities of the main picture and the subpicture are the same, and
  ii) determining the offset of the first field by subtracting ½ from ½ of the reciprocal of the compression rate and setting the offset of the second field to −1 when the field polarities of the main picture and the subpicture are different;

a second offset generation circuit for
  i) setting the offset of the first field to 0, and determining the offset of the second field by subtracting ½ from ½ of the reciprocal of the compression rate when the field polarities of main picture and subpicture are the same, and
  ii) setting the offset of the first field to ½ of the reciprocal of the compression rate and the offset of the second field to −½ when the field polarities of the main picture and the subpicture are different; and a frequency difference detecting circuit for detecting a difference between a main picture field frequency and a subpicture field frequency, and selecting one of an output signal of said first offset generation circuit and an output signal of said second offset generation circuit to output based on said difference.

6. A method for vertically compressing a subpicture image signal for use with a main picture and a subpicture each having a respective first field and second field, said main picture having a scanning field, and said subpicture having a field scan start signal, comprising the steps of:

a) generating a first field discrimination signal for indicating whether the scanning field of the main picture starts with the first field or the second field of the main picture;

b) generating a second field discrimination signal for indicating a polarity of the field scan start signal of the subpicture compressed by a predetermined compression rate;

c) generating offsets for determining whether the subpicture signal compressed by the predetermined compression rate is put into the first field or the second field of the main picture for the first field and the second field of the subpicture based on i) said main picture field discrimination signal, ii) said subpicture field discrimination signal, and iii) said compression rate;

d) shifting a timing of the field scan start signal of said subpicture based on said offsets; and e) generating a vertically compressed subpicture image signal based on said offsets and said compression rate.

* * * * *